US005557106A

United States Patent [19]

Ioco

[11] Patent Number: 5,557,106
[45] Date of Patent: Sep. 17, 1996

[54] RODENT DISCRIMINATOR LENS

[75] Inventor: Frank Ioco, Brentwood, N.Y.

[73] Assignee: Alarm Device Manufacturing Co., Syosset, N.Y.

[21] Appl. No.: 515,764

[22] Filed: Aug. 15, 1995

[51] Int. Cl.[6] .................................. G02B 3/08; G01J 5/08
[52] U.S. Cl. ...................... 250/353; 250/DIG. 1; 359/742
[58] Field of Search ............................ 250/353, DIG. 1; 359/565, 566, 569, 571, 742

[56] References Cited

U.S. PATENT DOCUMENTS

| 4,757,204 | 7/1988 | Baldwin et al. | 250/353 |
| 4,912,331 | 3/1990 | Owers | 250/353 |
| 4,994,664 | 2/1991 | Veldkamp | 359/565 |
| 5,071,207 | 12/1991 | Ceglio et al. | 359/565 |
| 5,442,178 | 8/1995 | Baldwin | 250/353 |

Primary Examiner—Davis L. Willis
Assistant Examiner—Richard Hanig
Attorney, Agent, or Firm—Meltzer, Lippe, Goldstein, et al.

[57] ABSTRACT

A lens segment used in passive infrared motion detectors is disclosed. A preferred embodiment has semi-circular rings separated by grooves. The semi-circular rings are offset about a separation axis passing through their centers or optical axes. The separation axis effectively divides the lens segment into two subsegments causing projection of two cross-sectional areas of coverage, one offset from the other. This increases the size of the projected cross-sectional area of coverage preventing a rodent near the lens from substantially filling the projected cross-sectional area of coverage, thus avoiding detection of the rodent.

24 Claims, 6 Drawing Sheets

RODENT DISCRIMINATOR LENS

FIELD OF THE INVENTION

The present invention is directed to a rodent discriminator lens for a passive infrared (PIR) motion detector and, more particularly, to a lens for a PIR which reduces detection of rodents and small objects at close range.

BACKGROUND OF THE INVENTION

Motion detectors often use passive infrared (PIR) detectors, microwave transceivers, or both to sense motion. A PIR motion detector has a lens for monitoring IR energy in its field of view. The field of view of the PIR is an unobstructed view perceived from the lens of the PIR detector. The lens focuses or shapes the field of view of the PIR. The PIR motion detector senses a change of IR energy (i.e., heat) received when a body having a temperature different from the ambient temperature enters the PIR's field of view. When the monitored IR energy changes (i.e., a change of temperature), the presence of the body is detected. Typically, a PIR detector detects the presence of a warm body, i.e., the body temperature of a person. However, the PIR detector will also detect the presence of a body having a temperature lower than the ambient temperature. For simplicity, this discussion refers only to warm bodies, but the reader understands that the discussion is equally applicable to cool bodies. The change in the IR energy is due to the temperature differential between the temperature of the warm body and the ambient temperature. The PIR may be connected to trigger an alarm, turn on lights, etc.

In addition to IR energy changes, detection of a warm body depends on other factors as well. One such factor is the optical gain of the lens, which in turn is a function of the focal length and the area of the lens. A larger lens area allows collection of more IR energy, resulting in a higher gain. The shorter the focal length, the wider the field of view and its cross-sectional area of coverage.

The size of the warm body in relation to the size of the beam is important. Typically, in order to produce an adequate signal to detect the warm body, the warm body must substantially fill the entire field of view. Otherwise, the warm body may not be detected. Detection is also a function of the optical gain of the lens used to focus IR energy onto the PIR detector. The optical gain is a measure of the lens segment's ability to collect infrared energy. The optical gain is typically selected so that a body substantially filling the field of view will be detected. The optical gain could also be selected for optimum detection at a desired distance from the PIR detector.

Figure 1:
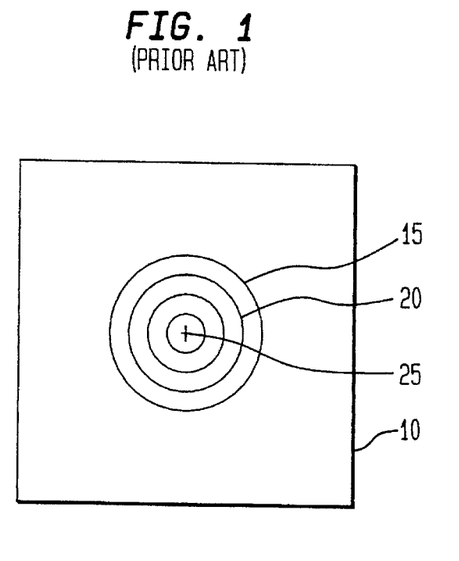
FIG. 1 is a prior art fresnel lens.

A commonly used lens for a PIR motion detector is a fresnel lens. FIG. 1 shows a conventional fresnel lens 10. The conventional fresnel lens 10 has concentric rings 15 which are separated by grooves 20. The center of the concentric rings 15 is called the optical axis 25 of the fresnel lens 10. The fresnel lens 10 is normally flat and may be inexpensively manufactured by molding or pressing in the same fashion as a musical record or compact disc. The fresnel lens may be manufactured from flexible plastic so that a curved opening of a housing containing the PIR detector may be covered with the flexible fresnel lens.

Figure 2:
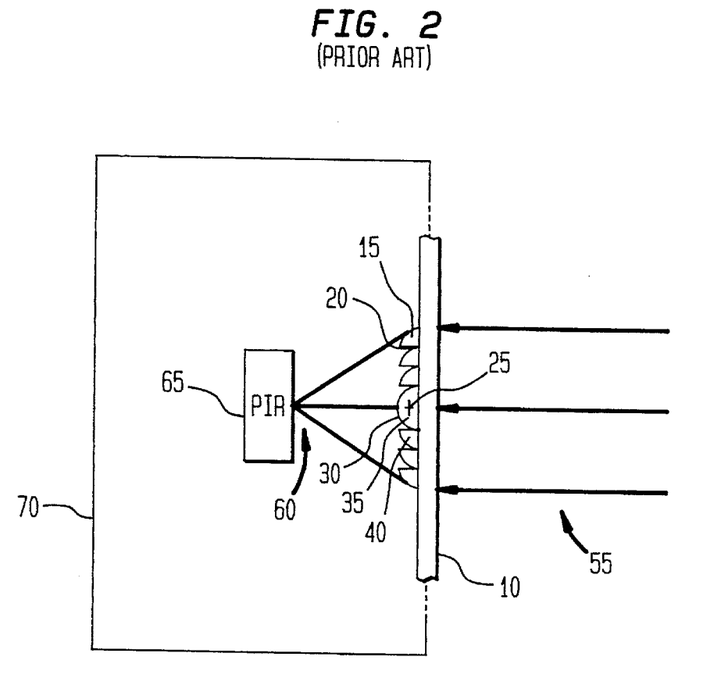
FIG. 2 is a side view of the prior art fresnel lens shown in FIG. 1.
Figure 3:
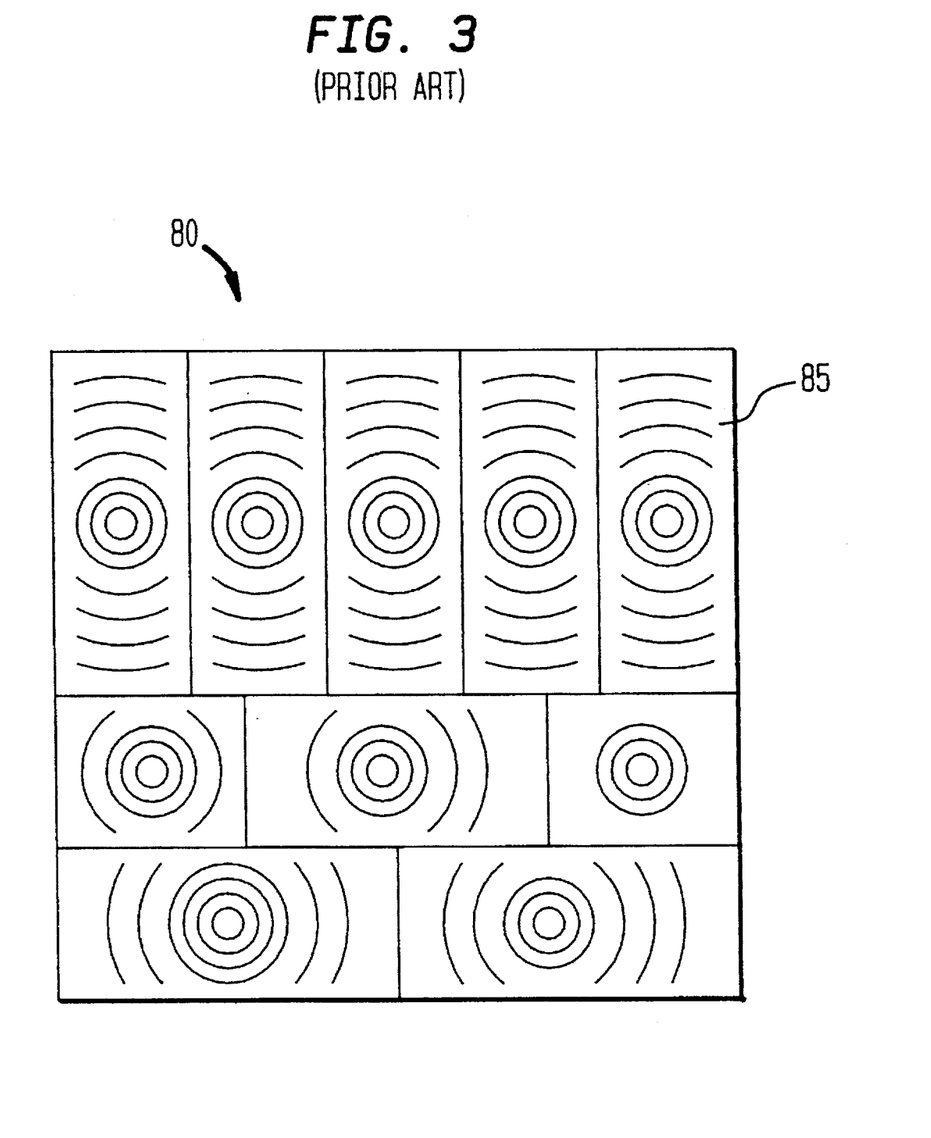
FIG. 3 is a prior art fresnel lens array.

The grooves 20 which separate the concentric rings 15 allow the fresnel lens 10 to function as a convex lens, yet remain relatively flat. FIG. 2 shows a side view of the fresnel lens 10. The protruding surface 30 of the center ring 35 has a convex shape. The protruding surfaces 40 of the remaining rings 15 have a partially convex surface. The shape of the concentric ring is the same as the surface of a conventional convex lens at a corresponding position. Similar to a conventional convex lens, infrared rays that pass through the optical axis 25 do not refract, whereas rays that pass through the rest of the lens 10 refract toward the center of the optical axis 25. This refraction is a function of the focal length of the lens 10 and results in focusing the incident IR rays 55 onto the focal point 60. In a PIR motion detector system, a PIR detector element 65 located in a housing 70 is placed near the focal point 60 and the lens 10 (or an array of lenses as shown in FIG. 3) is placed covering an opening in the housing 70 in front of the PIR detector element 65.

A lens for a PIR motion detector may be an array of fresnel lenses for monitoring an area, such as a room, in discrete zones of coverage. FIG. 3 illustrates such a lens array 80. Each fresnel lens or segment 85 of the fresnel lens array 80 may be focused on a different portion of the monitored area. However, because each segment 85 of the fresnel lens array 80 is approximately the same distance from the PIR detector element 65, all the segments 85 have approximately the same focal length.

Figure 4:
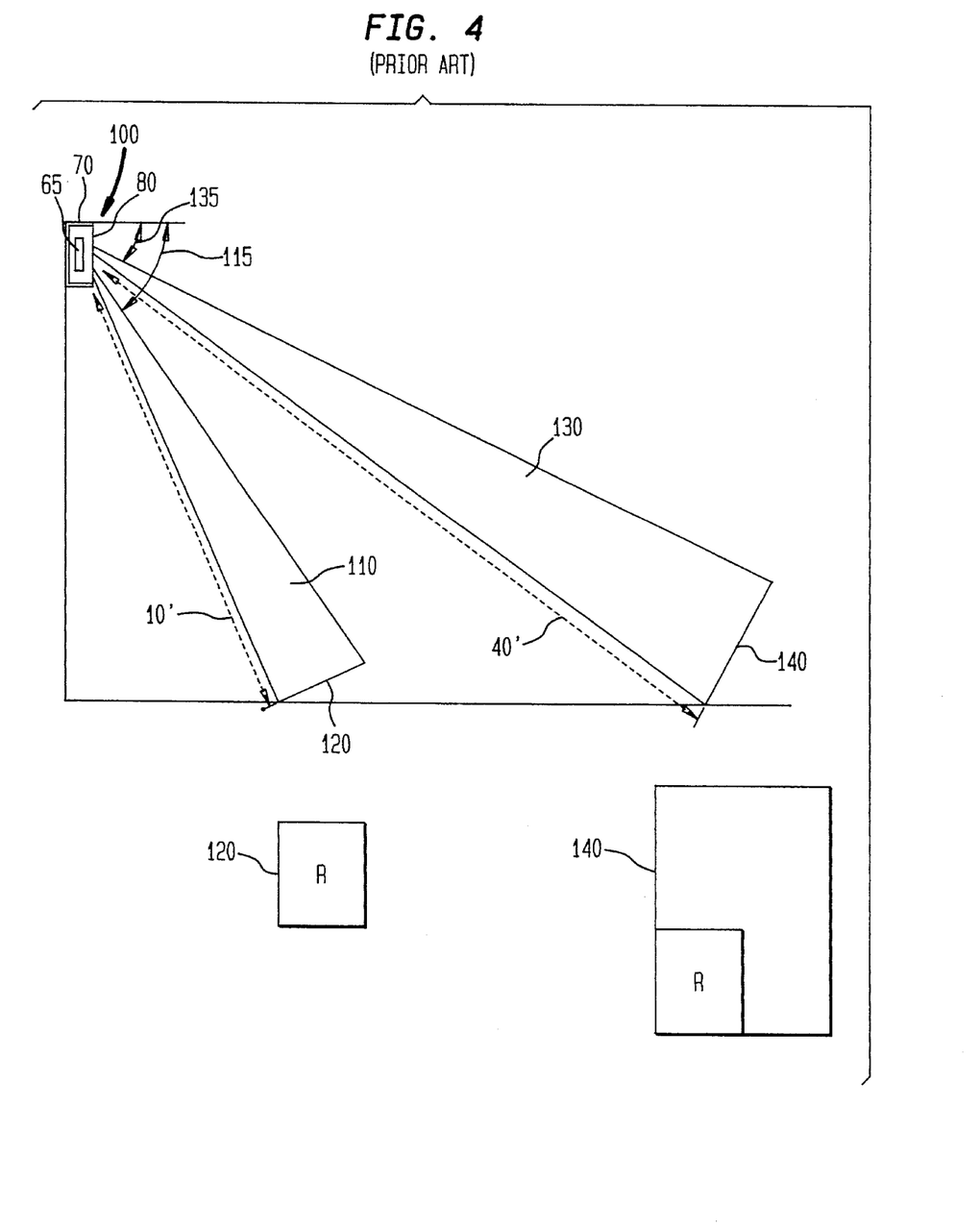
FIG. 4 illustrates a motion detector having a passive infrared (PIR) motion detector and the prior art fresnel lens array shown in FIG. 3.

FIG. 4 illustrates a motion detector 100 mounted on a wall or in a corner of a room. The motion detector 100 includes at least one PIR detector element 65 enclosed in a housing 70. The fresnel lens 80, shown in FIG. 3, covers an opening in the housing 70 in front of the PIR detector element 65. As mentioned in connection with FIG. 3, each lens segment 85 focuses a different field of view onto the PIR detector element 65 which monitors the IR energy in these fields of view. Two of the fields of view are shown in FIG. 4. (To solve the problem of changes in ambient temperature due to, for example, sunlight warming a portion of a room, zones of coverage using adjacent fields of view are used. The fields of view are monitored by two PIR detector elements which create offsetting electrical signals if simultaneously activated. This discriminates between motion, which activates one element at a time, and ambient temperature, which activates both elements simultaneously. For simplicity, this discussion will refer only to one of the projected cross-sectional areas in a zone of coverage, but the reader understands that the discussion is equally applicable to a pair of horizontally adjacent projected cross-sectional areas defining a zone of coverage.)

Illustratively, one field of view 110, shown in FIG. 4, looks down with a large elevation angle 115 and protects a target area 120 near the motion detector 100. The field of view 110 has a projected cross-sectional area of coverage 120 at a small distance from the motion detector 100. Illustratively, the target area 120 is at a distance of approximately 10' from the motion detector 100.

The second field of view 130 looks down with a small elevation angle 135 and protects a target area 140 far from the motion detector 100. The second field of view 110 has a projected cross-sectional area of coverage 140 at a larger distance. Illustratively, the target area 140 is at a distance of approximately 40' from the motion detector 100.

The focal length is typically selected so that a human being substantially fills the projected cross-sectional area of coverage 140 of the field of view 130 at the furthest target area, in this illustrative example, 40'.

Because all the segments 85 (FIG. 3) of the lens 80 have approximately the same focal length, the projected cross-sectional areas of coverage 120, 140, at distances 10' and 40' respectively, have different sizes. As the distance from the lens 80 is decreased by half, the cross-sectional area is reduced to one quarter.

One problem which has been known to those skilled in the art is known as the rodent discrimination problem. Small animals or rodents R, such as rats and squirrels, entering the projected cross-sectional area of coverage 120 at a short distance, e.g., 10', from the lens 80, substantially fill the projected cross-sectional area of coverage 120 and are detected by the motion detector 100. A warm body completely filling the field of view may be detected. For simplicity, this specification refers to rodents. The reader should understand, however, that the invention is equally applicable to a relatively small, warm (or cool) body. At close range, a rodent R substantially filling the projected cross-sectional area of coverage 120 causes false alarms. However, the same rodent R will not be detected at a distance further away from the lens 80, e.g. 40', because the projected cross-sectional area of coverage 140 is larger and the rodent R does not fill the projected cross-sectional area of coverage 140.

FIG. 4 shows illustrative sizes of the projected cross-sectional areas of coverage 120, 140. As shown in FIG. 4, at a distance of approximately 40 feet from the lens array 80, the projected cross-sectional area 140 of the field of view 130 is approximately 1.3' by 2.6' for a lens array 80 having a focal length FL=1.2" and a 2 mm×1 mm PIR detector element 65. The field of view 110 for the same detector at a distance of approximately 10 feet from the lens array 80, has a smaller projected cross-sectional area 120 of approximately 0.3' by 0.6'. This small projected cross-sectional area 120 at 10' is approximately the size of the rodent R. Thus, the rodent R will substantially fill this small projected cross-sectional area 120 and provide adequate signal for detection by the PIR detector element 65 causing a false alarm.

Figure 5A:
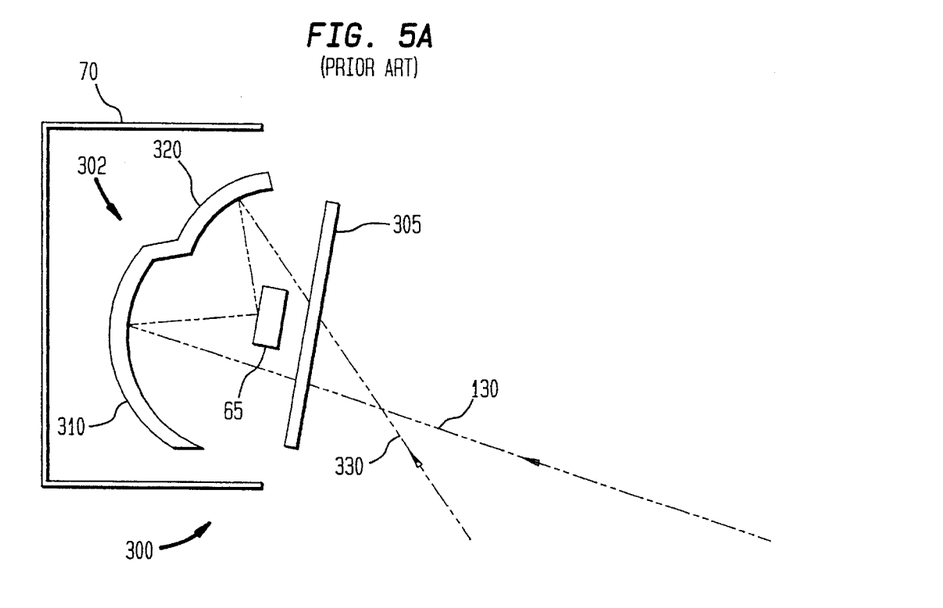
FIGS. 5A and 5B illustrate a motion detector having a passive infrared (PIR) motion detector and a prior art stepped mirror.
Figure 5B:
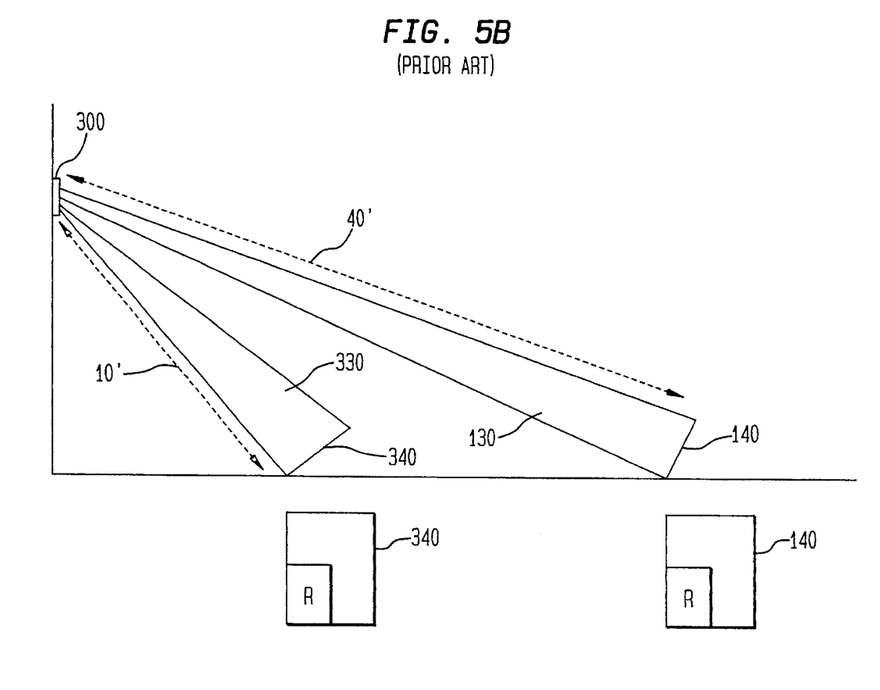

One known prior art solution to this problem, known as "step optics", uses mirrors and is illustrated in FIGS. 5A and 5B. FIG. 5A shows a side view of a motion detector 300 using a mirror 302 having a stepped or staircase-like surface. The stepped mirror 302 is located inside the motion detector housing 70, behind the PIR detector element 65. The PIR detector element 65 is located at the focal point between the mirror 302 and a window 305. Each step segment of the stepped mirror 302 has a particular focal length and field of view which depend in part on the curvature of the mirror portion collecting IR energy from the field of view. The step segment 310, which monitors the distant field (at a small elevation angle), has a large focal length. By contrast, the step segment 320, which monitors the close in field (at a large elevation angle), has a small focal length.

FIG. 5B shows the fields monitored by the step segments 310, 320. The step segment 310, having the large focal length, monitors the distant field of view 130. The projected cross-sectional area 140 of the distant field of view 130 is large so as to allow a human being to substantially fill the projected cross-sectional area of coverage 140 at the maximum range, e.g., approximately 40', as discussed in connection with FIG. 4. The step segment 320, having the small focal length, monitors the close in field of view 330. The projected cross-sectional area 340 of the closer field of view 330, approximately 10' from the motion detector 300, is of similar size as the cross-sectional area 140 of the distant field of view 130. Therefore, a rodent R will not be detected, despite being near the motion detector 300, (e.g., at 10' from the motion detector 300 with a large elevation angle), since it will not substantially fill the projected cross-sectional areas of coverage 140, 340.

However, such a stepped mirror is complex and expensive to produce. Furthermore, the stepped mirror has an unpleasant appearance. The stepped mirror, however, is not visible because it is located inside the housing 70.

Thus, it is an object of the present invention to provide a lens for a PIR detector that can effectively discriminate against rodents yet is simple and inexpensive to manufacture.

SUMMARY OF THE INVENTION

These and other objects are achieved by a rodent discriminator lens according to the present invention wherein a projected cross-section of the field of view near the lens is increased. In a preferred embodiment, the present invention increases the projected cross-section of a field of view near the lens by providing a lens which has offset portions. The inventive lens comprises at least first and second portions separated by a separation axis. The first portion has a first optical axis and monitors a first field of view. The second portion has a second optical axis and monitors a second field of view. The second optical axis is offset from the first optical axis along the separation axis, wherein the second field of view is adjacent the first field of view. The first and second optical axes may be offset in elevation, having the same azimuth angle.

In an illustrative embodiment, the first portion comprises a first set of rings having an optical axis on a vertical separation axis. The first set of rings focus infrared energy in the first field of view. The second portion comprises a second set of rings having an optical axis offset from the optical axis of the first set of rings on the vertical separation axis. The second set of rings focus infrared energy in the second field of view. Furthermore, the inventive lens may be a segment of an array of lenses.

BRIEF DESCRIPTION OF THE DRAWINGS

The present invention is described with reference to the following figures.

DETAILED DESCRIPTION OF PREFERRED EMBODIMENTS

Figure 6:
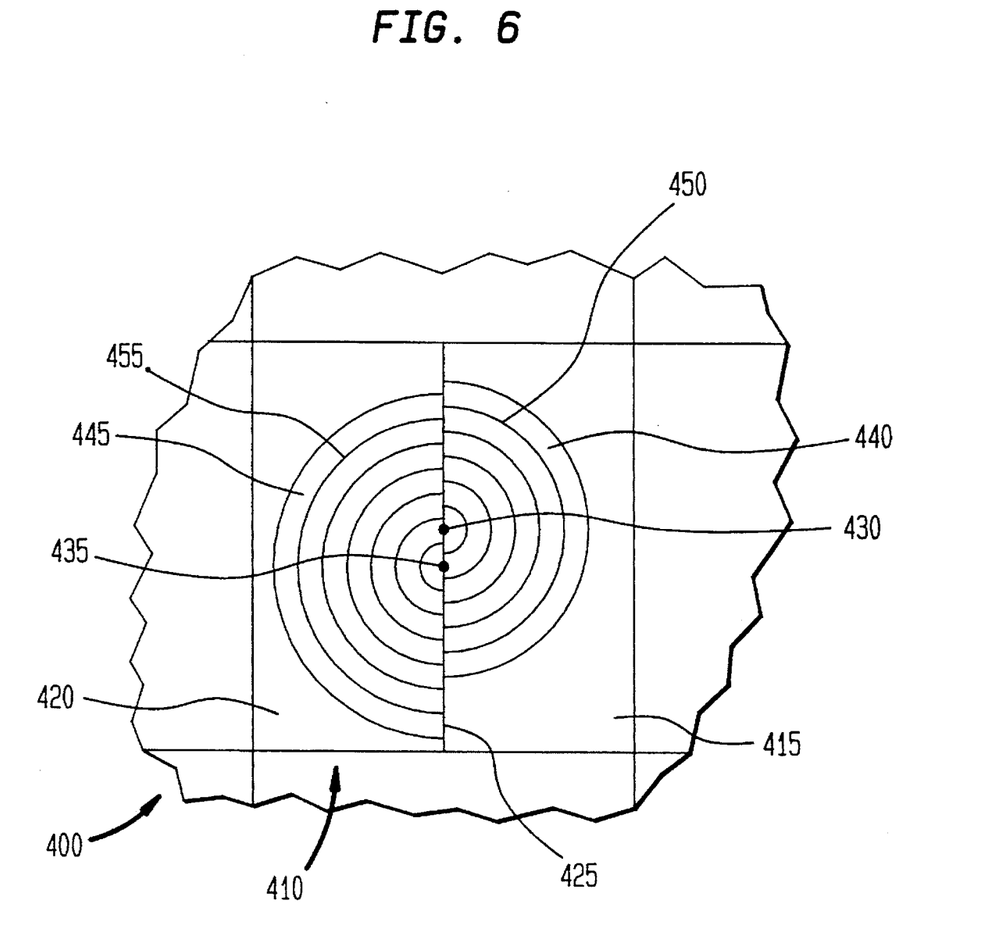
FIG. 6 is an illustrative embodiment of the lens according to the present invention using vertically offset rings.

FIG. 6 is an illustrative embodiment of the present invention. FIG. 6 shows an optical element 400 comprising an array of fresnel lenses 410. The lens array 400 is similar to the array of conventional fresnel lenses shown in FIG. 3. However, at least one lens, such as lens 415, is an offset fresnel lens according to the present invention. For simplicity, the discussion will be confined to a single offset fresnel lens, however, the reader understands that the invention contemplates that a single lens, or at least one lens of an array of lenses may be used. The offset fresnel lens has a first portion 415 and a second portion 420 which are separated by a separation axis 425. In a preferred embodiment, the optical axes 430, 435 of the first and second portions 415, 420 are offset from each other along a vertically oriented separation axis 425. In this preferred embodiment, the first and second portions 415, 420 have a first and second set of rings 440, 445 respectively. The rings 440, 445 allow the lens 410 to function as a convex lens despite being flat as discussed in connection with FIG. 2.

The flat lens 410 (or lens array 400) may be flexible and may be bent to cover a curved opening or window in the housing 70 in front of the PIR detector element 65 (FIG. 2). In a preferred embodiment, the rings 440, 445 are semicircular rings separated by semi-circular grooves 450, 455. The rings 440, 445 may be located on the inside of the lens 410 (i.e., inside the housing 70) facing the PIR detector element 65, or may be located on the outside of the lens 410 facing the monitored field of view. However, having the rings 440, 445 on the outside of the lens 410, allows dust and dirt accumulation within the grooves 450, 455, which affects the lens' ability to properly focus energy onto the PIR detector element 65. Therefore, the rings 440, 445 are preferably on the inside of the lens 410, so that the outer surface of the lens 410 remains smooth, which has a more pleasant appearance and does not accumulate dust and dirt.

Figure 7A:
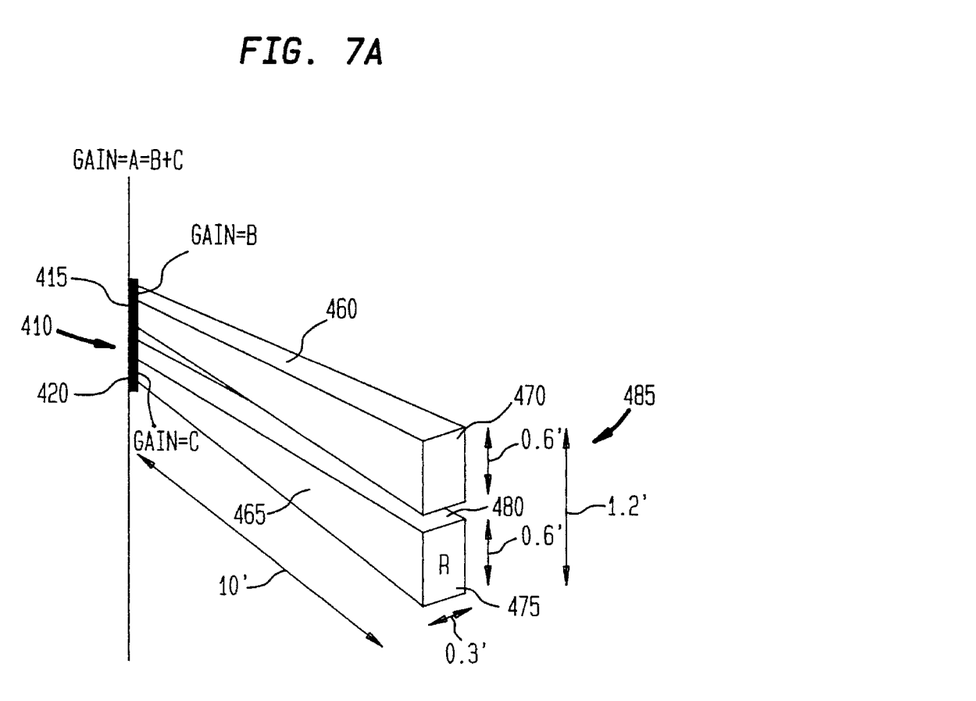
FIGS. 7A, 7B are side views that compare cross-sectional areas protected by a lens according to the embodiment of the present invention shown in FIG. 6 and a conventional lens.

FIG. 7A shows a side view of the inventive lens 410 looking down to monitor an area 10 feet from the lens 410. The inventive lens 410 may be placed in front of a PIR detector element 65 (not shown in FIG. 7A, but see FIGS. 2 and 4) to focus a double field of view 460, 465 onto the PIR detector. This allows the PIR detector to monitor two projected cross-sectional areas 470, 475. One projected cross-sectional area 470 is offset vertically from the other projected cross-sectional area 475. The first and second portions 415, 420 of the inventive lens 410 focus infrared energy onto the projected cross-sectional areas 470, 475, respectively, onto the PIR element 65.

Figure 7B:
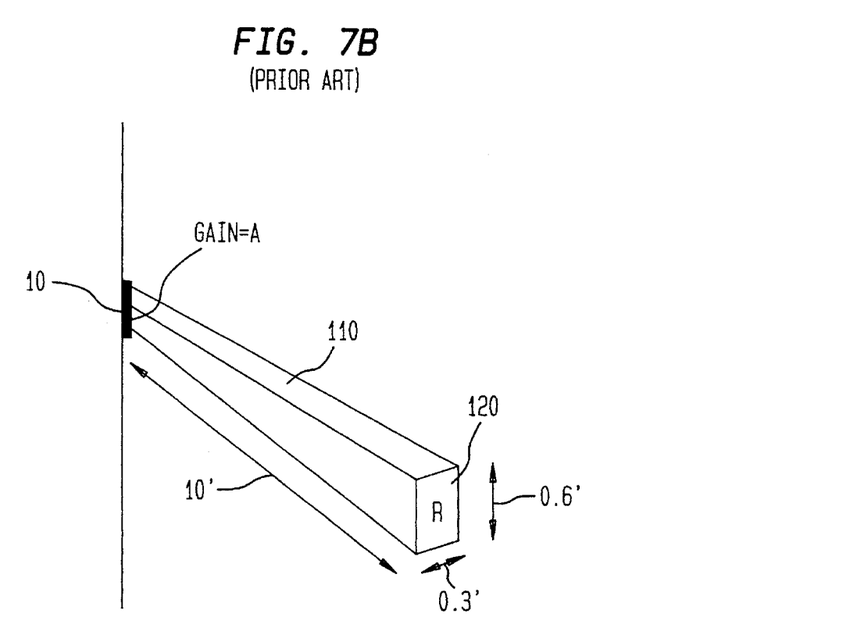

FIGS. 7A, 7B compare the two offset fields of view 460, 465 created by the inventive lens 410 with the field of view 110, also shown in FIG. 4, created by the conventional non-offset lens 10 (of FIG. 1 or the array 80 of FIGS. 3 and 4). The conventional non-offset lens 10 has the same optical gain as the inventive lens 410. In this embodiment, all the fields of view 460, 465, 110 have the same azimuth angle. In addition, the elevation angle (i.e., look down angle) of the fields of view 110 and the midpoint 480 between the fields of view 460, 465, are the same.

The projected cross-sectional areas 470, 475 are adjacent to each other and each independently focuses on a target. Thus, the combined monitored projected cross-sectional area 485 of the inventive lens 410 is the sum of the individual monitored projected cross-sectional areas 470, 475. The combined projected cross-sectional area 485 is preferably selected to be approximately twice the monitored projected cross-sectional area 120 of the conventional lens 10. The optical gain of the conventional lens 10, which monitors the projected cross-sectional area 120, equals the optical gain of the inventive lens 410, which monitors the combined projected cross-sectional area 485.

Since the inventive lens 410 has the same optical gain as the conventional lens 10 while monitoring the combined projected cross-sectional area 485, which is approximately twice as large as the projected cross-sectional area 120, the IR energy from a rodent R filling half the combined projected cross-sectional area 485, i.e., filling the cross-sectional area 475, will be amplified by only half the gain. Therefore, the rodent R will be not detected by the inventive lens 410. In contrast, the same rodent R fills the entire cross-sectional area 120 and the IR energy will be amplified by the full gain of the conventional lens 10. Therefore, the rodent R will be detected by the conventional lens 10.

FIGS. 7A and 7B also compare the gains and the size of the projected cross-sectional areas of coverage at a distance of 10' from a lens of an illustrative conventional non-offset and inventive offset lenses. In this illustration, the focal length FL of both the conventional lens 10 and the inventive offset lens 140 is 1.2 inches (FL=1.2").

As shown in FIG. 7B, the projected cross-sectional area of coverage 120 for the conventional lens 10 (at 10' and FL=1.2") is approximately 0.3' by 0.6', and the gain of the conventional lens 10 is A. FIG. 7A shows the adjacent cross-sectional areas of coverage 470, 475 for the two portions 415, 420 of the inventive offset lens segment 410 (at 10' and FL=1.2") having a gain B and C, respectively. At a distance of 10 feet, the size of the combined projected cross-sectional area 485 is twice the size of the individual projected cross-sectional areas 470, 475.

The signal received by the PIR detector is related to the optical gain of the lens, which is directly proportional to the area of the lens, the cross-sectional area of the warm body, the temperature differential between the warm body and the ambient temperature, and inversely proportional with the square of the focal length FL.

Despite the larger combined projected cross-sectional area 485, the total gain of the inventive lens 410 remains the same as the gain of the conventional lens having a projected cross-sectional area 120 at 10 feet (which is half the size of the combined cross-sectional area 485). Thus, as shown in FIG. 7A, the sum of the gains B+C of each portion 415, 420 of the inventive lens segment 410, equals the gain A of the conventional lens segment 10. That is, A=B+C, where A is the gain of the conventional lens segment, and B, C are the gains of each portion 415, 420 of the inventive lens 410, respectively.

Each projected cross-sectional area 120, 470, 475, shown in the illustrative example of FIGS. 7A and 7B, has a size of approximately 0.3' by 0.6'. Therefore, the combined cross-sectional area 485 of the fields of view 460, 465 has a size of approximately 0.3' by 1.2', which is the sum of the individual projected cross-sectional areas 470, 475 of each field of view 460, 465. This effectively doubles the projected cross-sectional area monitored by the lens segment 410 while keeping its gain constant.

Therefore, a rodent R, which may have a size sufficient to substantially fill a 0.3' by 0.6' projected cross-sectional area such as the projected cross-sectional area 120 of the conventional lens 10, no longer substantially fills the entire combined projected cross-sectional area 485. Illustratively, the rodent R substantially fills the projected cross-sectional area 475 of the lens portion 420 having a gain C which is less than the gain A of the conventional lens 10. Therefore, the rodent R is no longer detected and false alarms are eliminated.

It is also contemplated that increasing the projected cross-sectional area of coverage by having two fields of view 460, 465, which are offset in elevation, could also be accomplished with mirrors. Conventional mirrors may be modified to focus two overlapping fields of view as described above regarding fresnel lenses.

This invention has many advantages. The invention effectively discriminates against rodents at close range and reduces or eliminates false alarms. Thus, the "rodent discrimination" problem associated with fresnel lenses aimed close to the detector is solved. Because the gain in the offset regions is the sum of the gains of the individual fields of view, a rodent filling only one field of view will not be detected. Thus, the inventive lens provides the simple and inexpensive means to produce a fresnel lens with the improved rodent discrimination properties of the more complicated and expensive step mirror. This alleviates the need for complex and expensive subsystems in a PIR detection system.

The above described embodiment of the invention is intended to be illustrative only. Numerous alternative embodiments may be devised by those skilled in the art without departing from the spirit and scope of the following claims.

I claim:

1. A lens for a passive infrared device, comprising:
   a first portion having a first optical axis, the first optical axis having an azimuth, and a first elevation, the first portion being configured to monitor a first field of view,
   a second portion having a second optical axis and being separated from the first portion by a separation axis, the second optical axis having the azimuth, and a second elevation different from the first elevation, the second portion being configured to monitor a second field of view, and the first and second optical axes being on the separation axis, wherein the second optical axis is offset from the first optical axis, and wherein the first field of view is adjacent to the second field of view at a target distance.

2. The lens of claim 1, wherein the lens is a segment of an array of lenses.

3. The lens of claim 1, wherein the first portion comprises a first set of rings configured to focus infrared energy in said first field of view, and the second portion comprises a second set of rings configured to focus infrared energy in said second field of view.

4. The lens of claim 3, wherein the first and second set of rings are semi-circular.

5. The lens of claim 3, wherein the first and second set of rings are concentric semi-circular rings to their respective optical centers.

6. The lens of claim 1, wherein the first portion has a first gain and the second portion has a second gain, the sum of the first and second gains being sufficient to detect a warm body at the target distance.

7. The lens of claim 1, wherein the separation axis is vertical.

8. A passive infrared detector system comprising a passive infrared detector and an optical element, wherein said optical element comprises:
   a first portion having a first optical axis having an azimuth and a first elevation, the first portion being configured to monitor a first field of view,
   a second portion having a second optical axis and being separated from the first portion by a separation axis, the second optical axis having the azimuth and a second elevation, the second portion being configured to monitor a second field of view, and the first and second optical axes being on the separation axis, wherein the second optical axis is offset from the first optical axis, and wherein the first field of view is adjacent to the second field of view at a target distance.

9. The passive infrared detector system of claim 8, wherein the optical element is a segment of an array of lenses.

10. The passive infrared detector system of claim 8, wherein the first portion comprises a first set of rings configured to focus infrared energy in said first field of view, and the second portion comprises a second set of rings configured to focus infrared energy in said second field of view.

11. The passive infrared detector system of claim 10, wherein the first and second set of rings are semi-circular.

12. The passive infrared detector system of claim 8, wherein the first portion has a first gain and the second portion has a second gain, the sum of the first and second gains being sufficient to detect a human at the target distance.

13. The passive infrared detector system of claim 8, wherein the separation axis is vertical.

14. A motion detector comprising a passive infrared detector and a lens, wherein said lens comprises:
   a first portion having a first optical axis having an azimuth and a first elevation, the first portion being configured to monitor a first field of view,
   a second portion having a second optical axis and being separated from the first portion by a separation axis, the second optical axis having the azimuth and a second elevation different from the first elevation, the second portion being configured to monitor a second field of view, and the first and second optical axes being on the separation axis, wherein the second optical axis is offset from the first optical axis, and wherein the first field of view is adjacent to the second field of view at a target distance.

15. The lens of claim 14, wherein the lens is a segment of an array of lenses.

16. The lens of claim 14, wherein the first portion comprises a first set of rings configured to focus infrared energy in said first field of view, and the second portion comprises a second set of rings configured to focus infrared energy in said second field of view.

17. The lens of claim 16, wherein the first and second set of rings are semi-circular.

18. The lens of claim 14, wherein the first portion has a first gain and the second portion has a second gain, the sum of the first and second gains being sufficient to detect a human at the target distance.

19. The lens of claim 14, wherein the separation axis is vertical.

20. A lens for an infrared device comprising:
   a plurality of fresnel lens rings separated along a separation axis into a first set of partial rings having a first center and a second set of partial rings having a second center, wherein the first and second centers are on the separation axis and the first center is offset from the second center.

21. The lens of claim 20, wherein the rings are offset in elevation.

22. The lens of claim 20, wherein the lens is a segment of an array of lenses.

23. The lens of claim 20 wherein the first set of rings are configured to focus infrared energy in a first field of view, and the second set of rings configured to focus infrared energy in a second field of view, wherein said second field of view is adjacent to said first field of view.

24. The lens of claim 23, wherein the first and second set of rings are concentric semicircular rings.

* * * * *